(12) United States Patent
Branson et al.

(10) Patent No.: US 8,788,644 B2
(45) Date of Patent: Jul. 22, 2014

(54) TRACKING DATA PROCESSING IN AN APPLICATION CARRIED OUT ON A DISTRIBUTED COMPUTING SYSTEM

(75) Inventors: Michael J. Branson, Rochester, MN (US); Zachary A. Garbow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/129,284

(22) Filed: May 29, 2008

(65) Prior Publication Data

US 2009/0300624 A1 Dec. 3, 2009

(51) Int. Cl.
*G06F 15/173* (2006.01)
*G06F 17/30* (2006.01)
*G06F 9/50* (2006.01)
*H04L 29/08* (2006.01)
*H04L 29/06* (2006.01)

(52) U.S. Cl.
CPC ........ *G06F 17/30445* (2013.01); *G06F 9/5038* (2013.01); *G06F 9/5066* (2013.01); *H04L 67/1097* (2013.01); *H04L 29/08072* (2013.01); *H04L 29/06* (2013.01); *Y10S 707/99932* (2013.01)
USPC ........... 709/223; 709/201; 709/220; 709/226; 718/100; 718/102; 718/104; 707/2; 707/999.002; 707/E17.14

(58) Field of Classification Search
USPC .......................... 709/220, 223; 707/2; 718/104
See application file for complete search history.

(56) References Cited

U.S. PATENT DOCUMENTS

| | | | |
|---|---|---|---|
| 7,257,816 B2* | 8/2007 | Kulp et al. | 718/104 |
| 2008/0082644 A1* | 4/2008 | Isard et al. | 709/223 |
| 2009/0144228 A1* | 6/2009 | Duffy et al. | 707/2 |

* cited by examiner

*Primary Examiner* — Kyung H Shin
(74) *Attorney, Agent, or Firm* — Biggers Kennedy Lenart Spraggins LLP

(57) ABSTRACT

Methods, systems, and products are disclosed for tracking data processing in an application carried out on a distributed computing system, the distributed computing system including a plurality of computing nodes connected through a data communications network, the application carried out by a plurality of pluggable processing components installed on the plurality of computing nodes, the pluggable processing components including a pluggable processing provider component and a pluggable processing consumer component, that include: identifying, by the provider component, data satisfying predetermined processing criteria, the criteria specifying that the data is relevant to processing provided by the consumer component; passing, by the provider component, the data to the next pluggable processing component in the application for processing, including maintaining access to the data; receiving, by the consumer component, the data during execution of the application; and sending, by the consumer component, a receipt indicating that the consumer component received the data.

18 Claims, 8 Drawing Sheets

TRACKING DATA PROCESSING IN AN APPLICATION CARRIED OUT ON A DISTRIBUTED COMPUTING SYSTEM

BACKGROUND OF THE INVENTION

1. Field of the Invention

The field of the invention is data processing, or, more specifically, methods, apparatus, and products for tracking data processing in an application carried out on a distributed computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

Many applications that execute in these parallel computing systems are each composed of a plurality of individual, reusable software components. For example, a facial recognition software application may be composed of one reusable software component that performs image preprocessing, another reusable software component that performs face position detection within the processed image, still another reusable software component that measures facial features, and so on.

SUMMARY OF THE INVENTION

Methods, systems, and products are disclosed for tracking data processing in an application carried out on a distributed computing system. The distributed computing system includes a plurality of computing nodes connected for data communications through a data communications network. The application is carried out by a plurality of pluggable processing components installed on the plurality of computing nodes. The pluggable processing components include a pluggable processing provider component and a pluggable processing consumer component. Tracking data processing in an application carried out on a distributed computing system includes: identifying, by the pluggable processing provider component, data satisfying predetermined processing criteria, the predetermined processing criteria specifying that the data is relevant to processing provided by the pluggable processing consumer component; passing, by the pluggable processing provider component, the data to the next pluggable processing component in the application for processing, including maintaining access to the data; receiving, by the pluggable processing consumer component, the data during execution of the application; and sending, by the pluggable processing consumer component, a receipt indicating that the pluggable processing consumer component received the data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
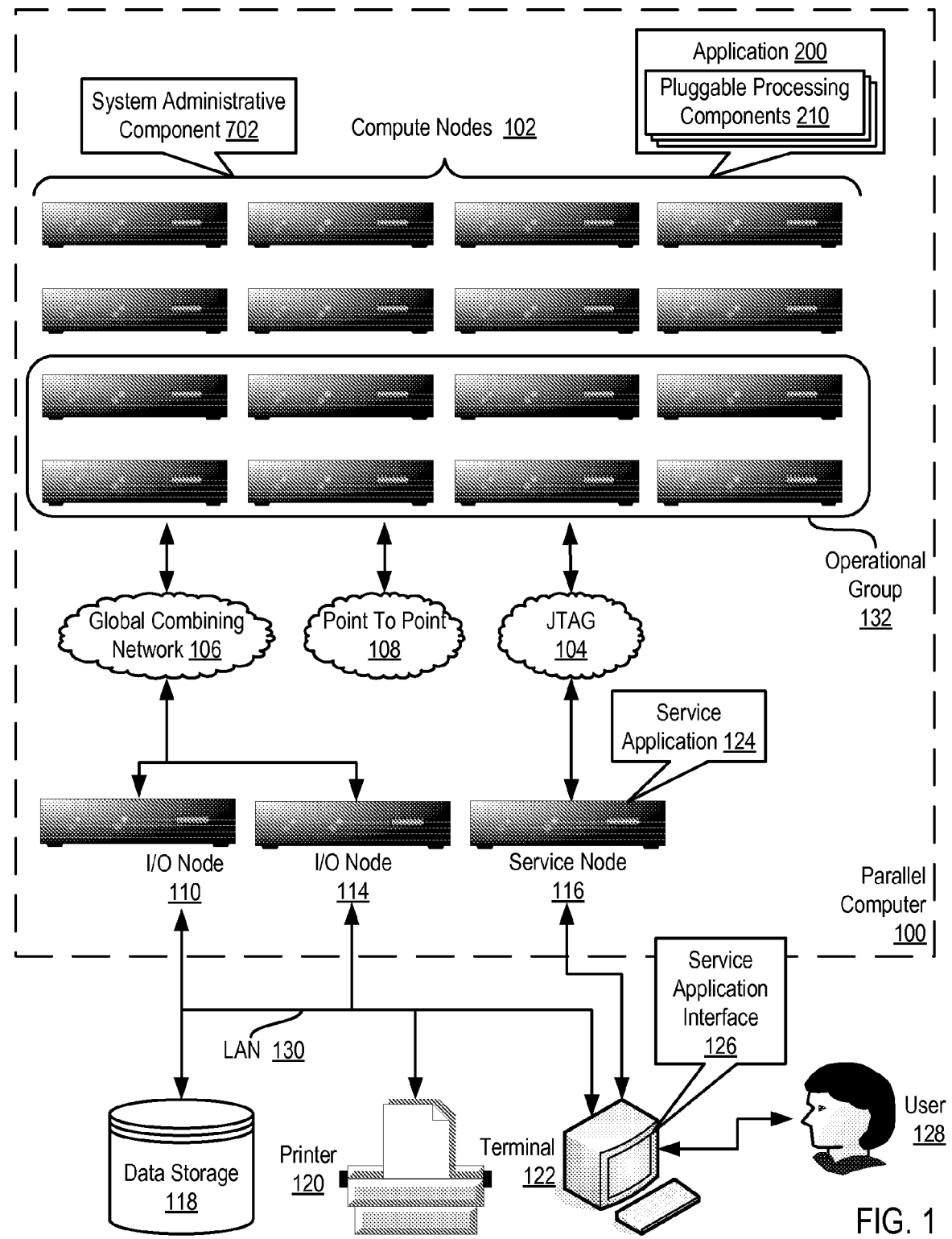
FIG. 1 illustrates an exemplary distributed computing system for tracking data processing in an application carried out on the distributed computing system according to embodiments of the present invention.

Exemplary methods, apparatus, and computer program products for tracking data processing in an application carried out on a distributed computing system according to embodiments of the present invention are described with reference to the accompanying drawings, beginning with FIG. 1. FIG. 1 illustrates an exemplary distributed computing system for tracking data processing in an application carried out on the distributed computing system according to embodiments of the present invention. The distributed computing system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

In the example of FIG. 1, the compute nodes (102) operate to execute an application (200) that is carried out using a plurality of pluggable processing components (210). A pluggable processing component is a software module, specifically a set of computer program instructions, that when executed performs a particular task that is a logical, discrete, reusable building block for more complex software systems. That is, a software developer may create a pluggable processing component to perform a specific task within broader software systems that the software developer can reuse from one system to another. The processing components are referred to as 'pluggable' because these components may be plugged together in different ways to form a variety of software applications.

For an example application, consider a plurality of pluggable processing components that implement a facial recognition system and that operate as follows: An image identification component provides an image to a preprocessing component, which cleans up the image by removing visual noise attributable to the camera capturing the image or other visual noise or aberrations. The preprocessing component provides the preprocessed image to a face detection component that identifies a person's face within the image. The face detection component in turn provides the image and the location of the face in the image to an alignment component that determines the head's position, size, and pose. The alignment component then provides the image and the alignment data to a measurement component that measures the curves of the face on a sub-millimeter or microwave scale and creates a template that describes the features of the face in the image. A representation component receives the template from the measure component and translates the template into a set of codes that represent the features of the face in the image. The representation component then provides the set of codes to a matching component that compares the set of codes with codes representing faces of known persons in a database to identify a match. When performing identity verification, a candidate verification/identification component receives an identifier for a matching face in the database and compares information associated with the matched face in the database with information provided by the person whose face is captured for facial recognition. When performing identification, the candidate verification/identification component receives an identifier for a matching face in the database and provides system administrators with the information associated with the matched face in the database.

The pluggable processing components (210) of FIG. 1 include pluggable processing provider components and pluggable processing consumer components. A pluggable processing provider component is a pluggable processing component that provides data to other pluggable processing components for consumption. A pluggable processing consumer component is a pluggable processing component that received data from other pluggable processing components for further data processing. Readers will note that a particular pluggable processing component may operate as both a provider component and a consumer component concurrently. For example, consider again the exemplary facial recognition system described above. The image preprocessing component is a consumer component with respect to the image identification component, while concurrently operating as a provider component with respect to the face detection component.

In the example of FIG. 1, both the pluggable processing provider components and the pluggable processing consumer components operate generally for tracking data processing in an application carried out on a distributed computing system according to embodiments of the present invention. The pluggable processing provider components operate generally for tracking data processing in an application carried out on a distributed computing system according to embodiments of the present invention by: identifying data satisfying predetermined processing criteria, the predetermined processing criteria specifying that the data is relevant to processing provided by the pluggable processing consumer component; and passing the data to the next pluggable processing component in the application for processing, including maintaining access to the data. The pluggable processing consumer components operate generally for tracking data processing in an application carried out on a distributed computing system according to embodiments of the present invention by: receiving the data during execution of the application; and sending a receipt indicating that the pluggable processing consumer component received the data.

The pluggable processing provider components may also operate generally for tracking data processing in an application carried out on a distributed computing system according to embodiments of the present invention by: receiving, from the pluggable processing consumer component, the receipt indicating that the pluggable processing consumer component received the data; and administering the data in response to receiving the receipt. Because a pluggable processing provider component may not always receive the receipt from the consumer component, the pluggable processing provider components may operate generally for tracking data processing in an application carried out on a distributed computing system according to embodiments of the present invention by: determining that the pluggable processing provider component did not receive the receipt within a predefined time period; and performing one or more corrective actions in response to not receiving the receipt within a predefined time period.

Also installed on the plurality of compute nodes (102) of FIG. 1 is a system administrative component (702). The system administrative component (702) of FIG. 1 is a set of computer program instructions for managing the plurality of pluggable processing components carrying out the application (200). In some embodiments, the pluggable processing consumer components may not have enough information about the provider component to send a receipt directly to the provider component. In such embodiments, the system administrative component (702) may operate generally for tracking data processing in the application (200) carried out on a distributed computing system according to embodiments of the present invention by: receiving, from the pluggable processing consumer component, the receipt indicating that the pluggable processing consumer component received the data; and sending, to the pluggable processing provider component, the receipt indicating that the pluggable processing consumer component received the data. The pluggable processing provider component may in turn operate for tracking data processing in the application (200) carried out on a distributed computing system according to embodiments of the present invention by: receiving, from the system administrative component, the receipt indicating that the pluggable processing consumer component received the data; and administering the data in response to receiving the receipt.

The execution configuration for the pluggable processing components (210) may change during or between periods in which the pluggable processing components (210) are executed on the compute nodes (102). In the example of FIG. 1, each pluggable processing component (210) may be executed on a different compute node (102). In some configurations, however, compute nodes (102) may support multiple pluggable processing components (210). During execution, a service node may move one pluggable processing component (210) from one compute node (102) to another, or multiple pluggable processing components (210) may be collapsed for execution on one compute node (102) from multiple compute nodes (102). The service node may move a pluggable processing component (210) from one node to another by transferring the executable version of the pluggable processing component (210) along with processing state information such as memory contents, cache contents, processor registers, data, and so on from one compute node to another.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although tracking data processing in an application carried out on a distributed computing system according to embodiments of the present invention is described above in terms of an architecture for a parallel computer, readers will note that such an embodiment is for explanation only and not for limitation. In fact, tracking data processing in an application carried out on a distributed computing system according to embodiments of the present invention may be implemented using a variety of distributed computer system architectures composed of a plurality of nodes network-connected together, including for example architectures for a cluster of nodes, a grid computing system, and so on.

The arrangement of nodes, networks, and I/O devices making up the exemplary system illustrated in FIG. 1 are for explanation only, not for limitation of the present invention. Data processing systems capable of tracking data processing in an application carried out on a distributed computing system according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of tracking data processing in an application carried out on a distributed computing system according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Tracking data processing in an application carried out on a distributed computing system according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of tracking data processing in an application carried out on a distributed computing system (210) according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152).

Figure 2:
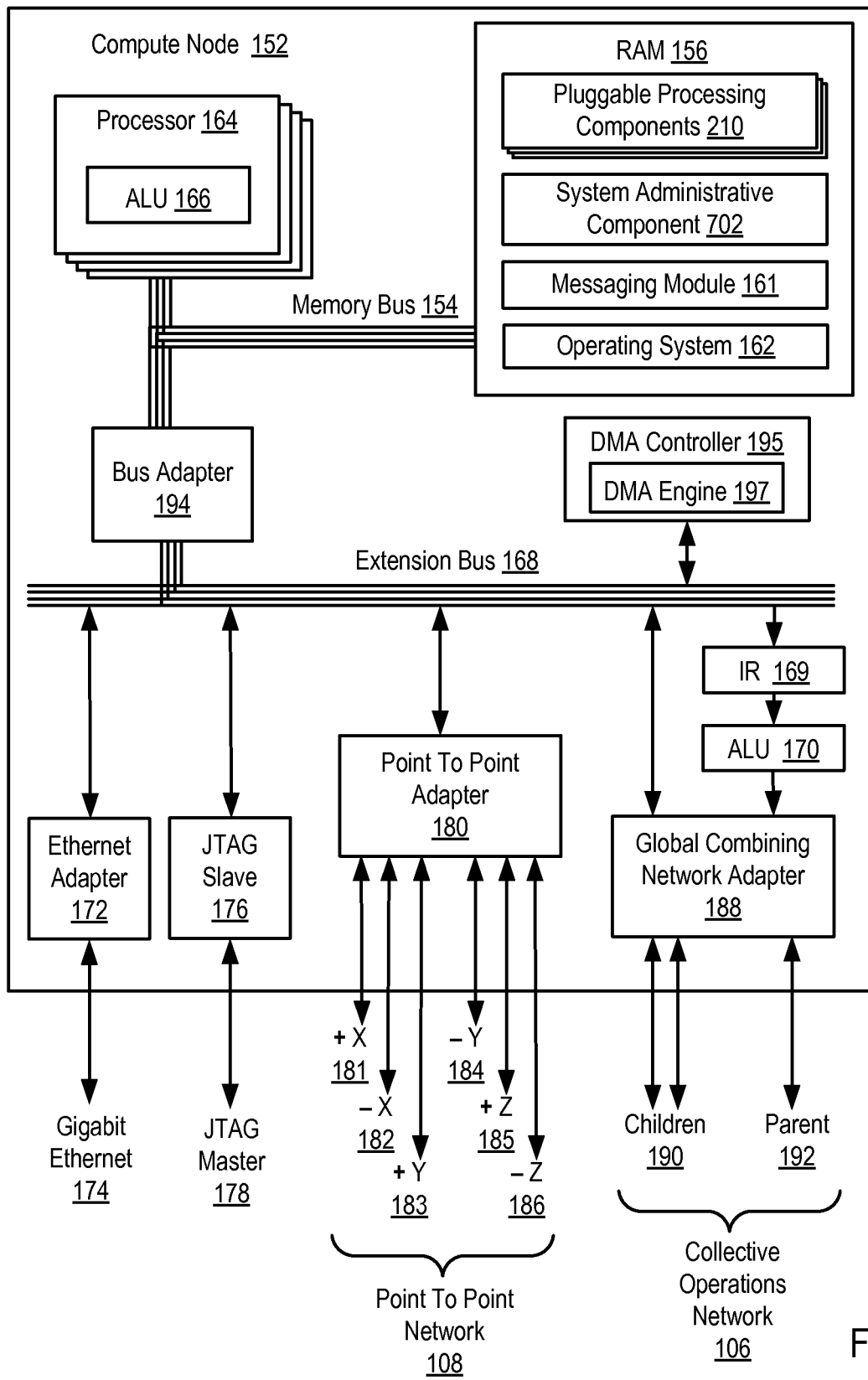
FIG. 2 sets forth a block diagram of an exemplary compute node useful in a distributed computing system capable of tracking data processing in an application carried out on the distributed computing system according to embodiments of the present invention.

Stored in RAM (156) of FIG. 2 are one or more pluggable processing components (210) used to carry out an application. As mentioned above, a pluggable processing component is a set of computer program instructions that when executed performs a particular task that is a logical, discrete, reusable building block for more complex software systems. The pluggable processing components (210) of FIG. 2 include pluggable processing provider components and pluggable processing consumer components. In the example of FIG. 2, both the pluggable processing provider components and the pluggable processing consumer components operate generally for tracking data processing in an application carried out on a distributed computing system according to embodiments of the present invention. The pluggable processing provider components operate generally for tracking data processing in an application carried out on a distributed computing system according to embodiments of the present invention by: identifying data satisfying predetermined processing criteria, the predetermined processing criteria specifying that the data is relevant to processing provided by the pluggable processing consumer component; and passing the data to the next pluggable processing component in the application for processing, including maintaining access to the data. The pluggable processing consumer components operate generally for tracking data processing in an application carried out on a distributed computing system according to embodiments of the present invention by: receiving the data during execution of the application; and sending a receipt indicating that the pluggable processing consumer component received the data.

The pluggable processing provider components may also operate generally for tracking data processing in an application carried out on a distributed computing system according to embodiments of the present invention by: receiving, from the pluggable processing consumer component, the receipt indicating that the pluggable processing consumer component received the data; and administering the data in response to receiving the receipt. Because a pluggable processing provider component may not always receive the receipt from the consumer component, the pluggable processing provider components may operate generally for tracking data processing in an application carried out on a distributed computing system according to embodiments of the present invention by: determining that the pluggable processing provider component did not receive the receipt within a predefined time period; and performing one or more corrective actions in response to not receiving the receipt within a predefined time period.

Also installed in RAM (156) of FIG. 2 is a system administrative component (702). The system administrative component (702) of FIG. 2 is a set of computer program instructions for managing the plurality of pluggable processing components carrying out the application (200). In some embodiments, the pluggable processing consumer components may not have enough information about the provider component to send a receipt directly to the provider component. In such embodiments, the system administrative component (702) may operate generally for tracking data processing in the application (200) carried out on a distributed computing system according to embodiments of the present invention by: receiving, from the pluggable processing consumer component, the receipt indicating that the pluggable processing consumer component received the data; and sending, to the pluggable processing provider component, the receipt indicating that the pluggable processing consumer component received the data. The pluggable processing provider component may in turn operate for tracking data processing in the application (200) carried out on a distributed computing system according to embodiments of the present invention by: receiving, from the system administrative component, the receipt indicating that the pluggable processing consumer component received the data; and administering the data in response to receiving the receipt.

Also stored RAM (156) is a messaging module (161), a library of computer program instructions that carry out parallel communications among compute nodes, including point to point operations as well as collective operations. The pluggable processing components (210) effect data communications among one another and with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for tracking data processing in an application carried out on a distributed computing system according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in tracking data processing in an application carried out on a distributed computing system according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
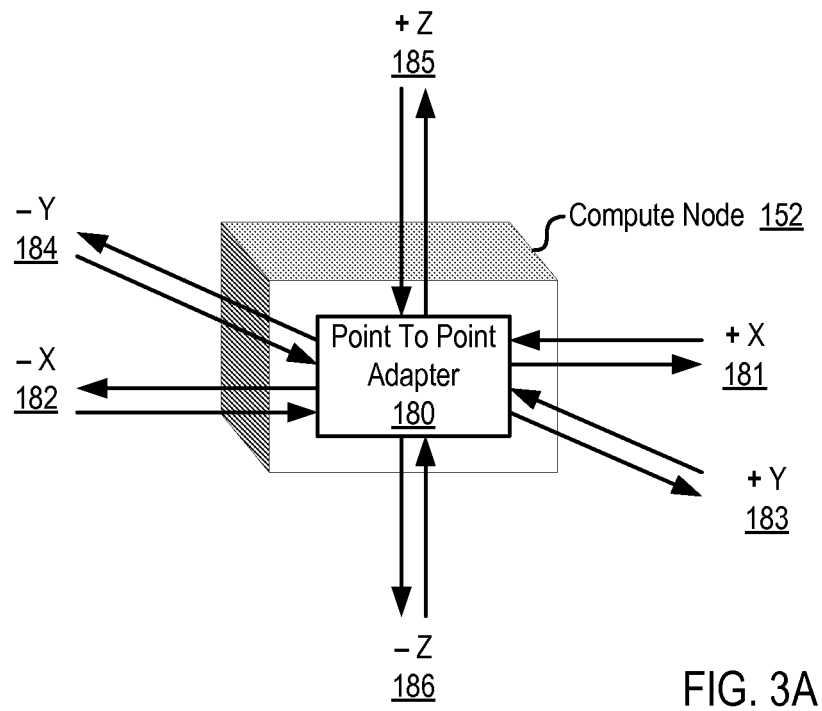
FIG. 3A illustrates an exemplary Point To Point Adapter useful in distributed computing systems capable of tracking data processing in an application carried out on the distributed computing system according to embodiments of the present invention.

For further explanation, FIG. 3A illustrates an exemplary Point To Point Adapter (180) useful in distributed computing systems capable of tracking data processing in an application carried out on the distributed computing system according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
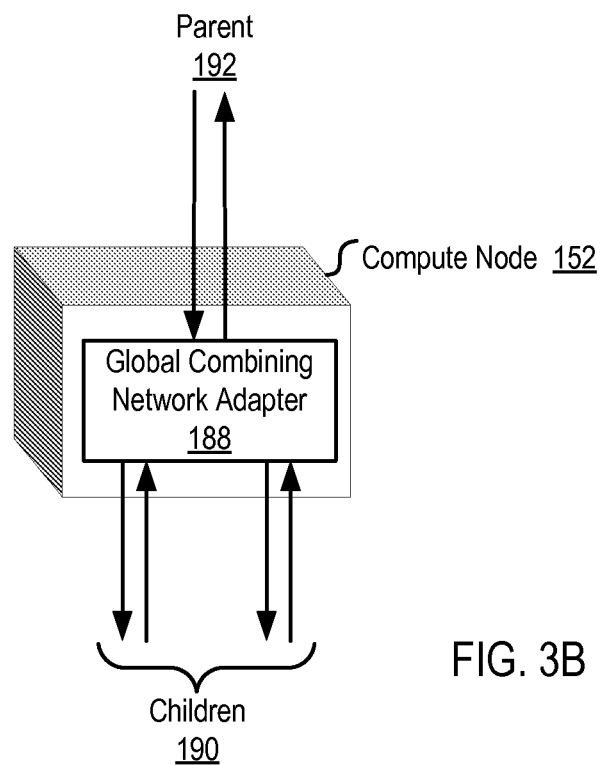
FIG. 3B illustrates an exemplary Global Combining Network Adapter useful in distributed computing systems capable of tracking data processing in an application carried out on the distributed computing system according to embodiments of the present invention.

For further explanation, FIG. 3B illustrates an exemplary Global Combining Network Adapter (188) useful in distributed computing systems capable of tracking data processing in an application carried out on the distributed computing system according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
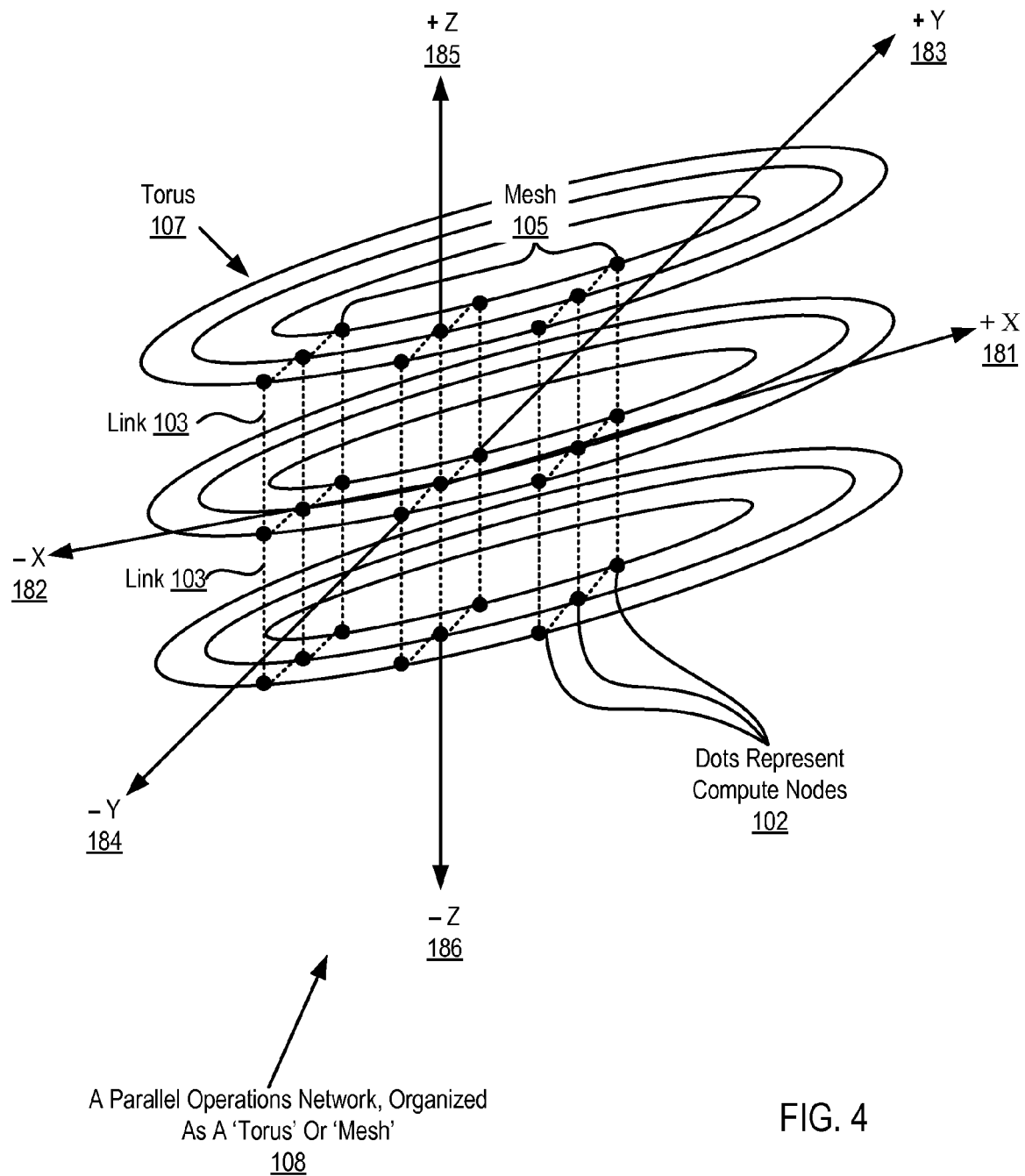
FIG. 4 sets forth a line drawing illustrating an exemplary data communications network optimized for point to point operations useful in distributed computing systems capable of tracking data processing in an application carried out on the distributed computing system in accordance with embodiments of the present invention.

For further explanation, FIG. 4 sets forth a line drawing illustrating an exemplary data communications network (108) optimized for point to point operations useful in distributed computing systems capable of tracking data processing in an application carried out on a distributed computing system in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in tracking data processing in an application carried out on a distributed computing system in accordance with embodiments of the present invention may contain only a few compute nodes or may contain thousands of compute nodes.

Figure 5:
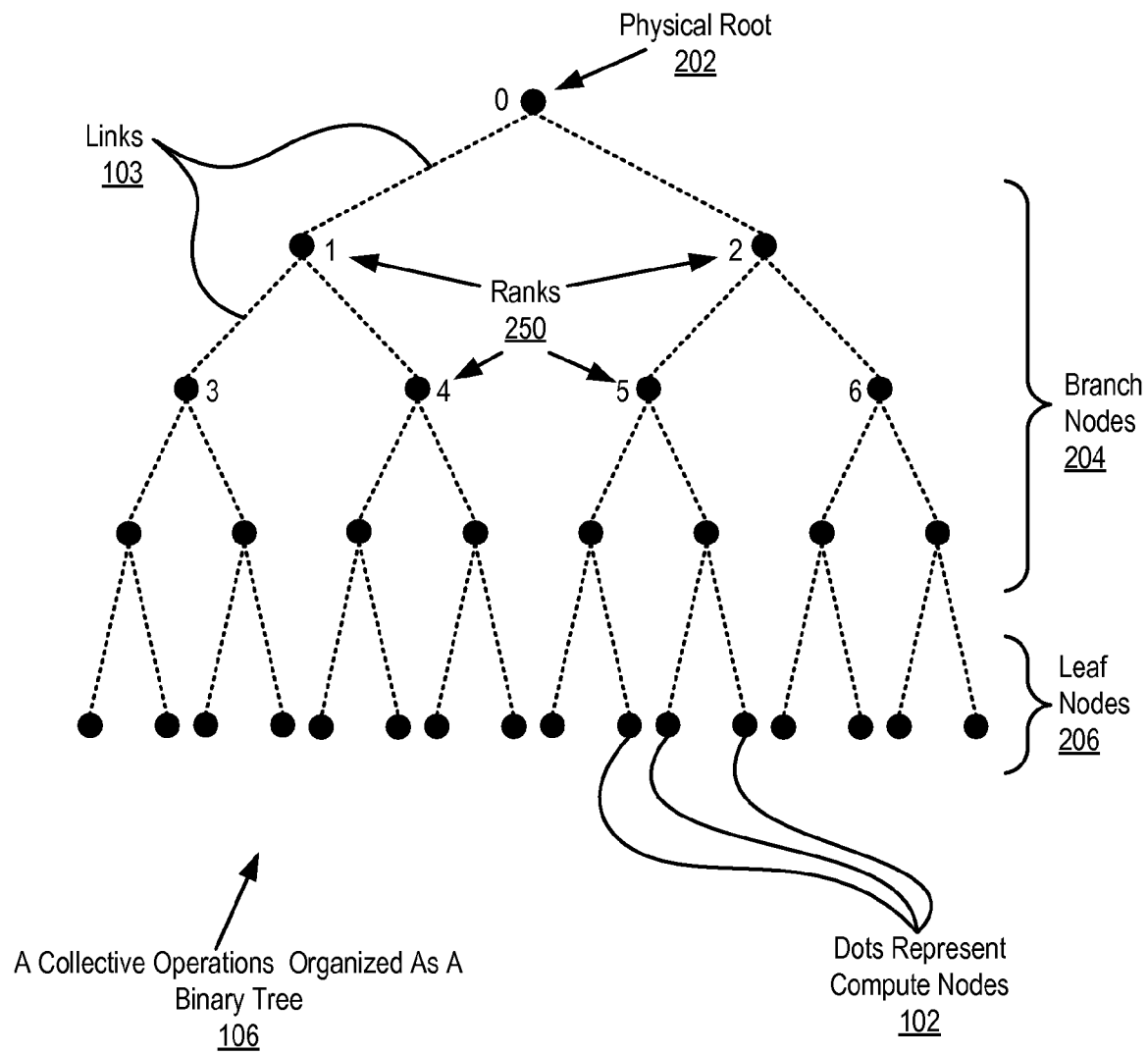
FIG. 5 sets forth a line drawing illustrating an exemplary data communications network optimized for collective operations useful in distributed computing systems capable of tracking data processing in an application carried out on the distributed computing system in accordance with embodiments of the present invention.

For further explanation, FIG. 5 sets forth a line drawing illustrating an exemplary data communications network (106) optimized for collective operations useful in systems capable of tracking data processing in an application carried out on a distributed computing system in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for tracking data processing in an application carried out on a distributed computing system in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
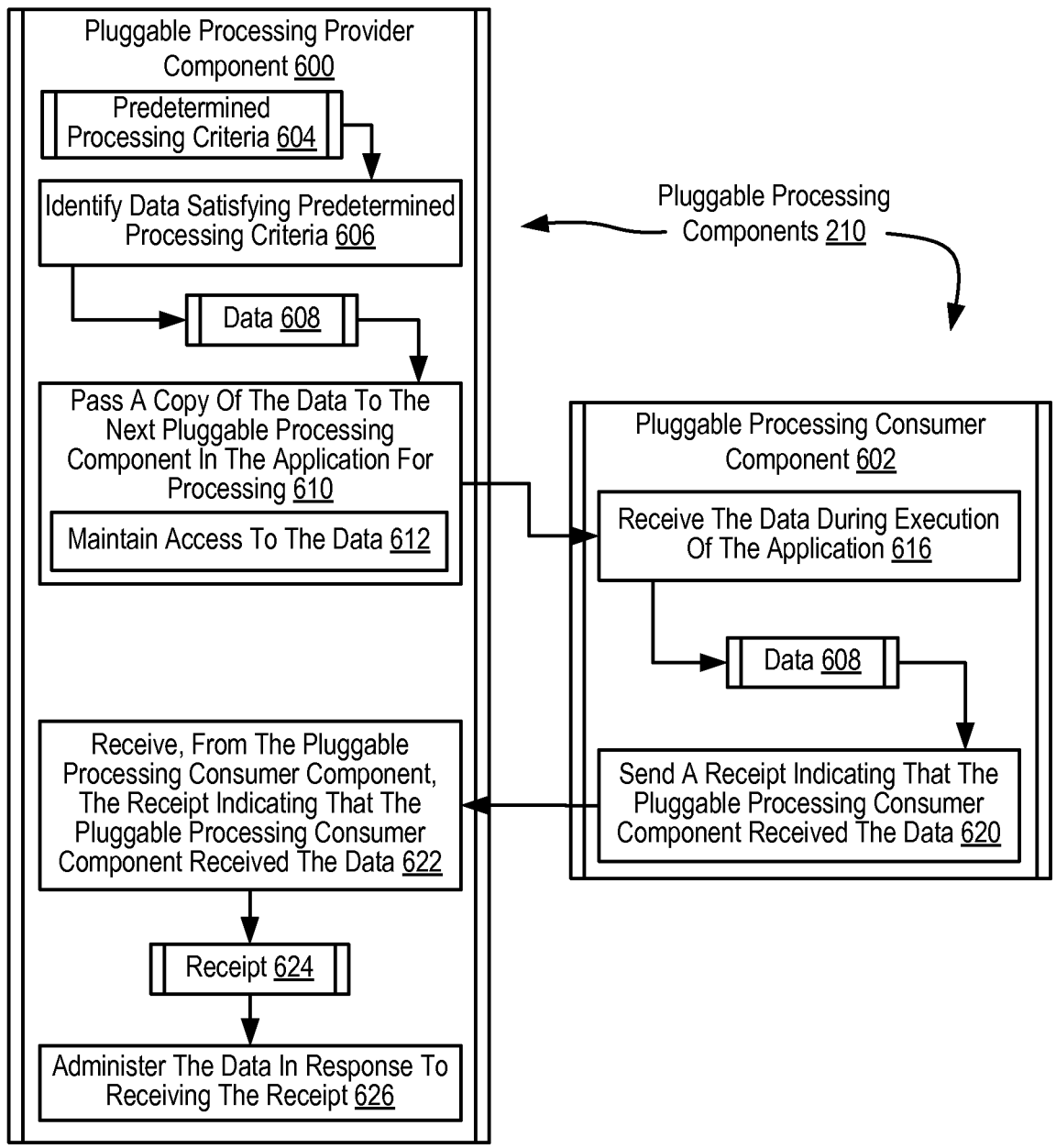
FIG. 6 sets forth a flow chart illustrating an exemplary method for tracking data processing in an application carried out on a distributed computing system according to embodiments of the present invention.

For further explanation, FIG. 6 sets forth a flow chart illustrating an exemplary method for tracking data processing in an application carried out on a distributed computing system according to embodiments of the present invention. The distributed computing system described with reference to FIG. 6 includes a plurality of computing nodes connected for data communications through a data communications network. The application carried out by a plurality of pluggable processing components (210) installed on the plurality of computing nodes. The pluggable processing components (210) include a pluggable processing provider component (600) and a pluggable processing consumer component (602).

The method of FIG. 6 includes identifying (606), by the pluggable processing provider component (600), data satisfying predetermined processing criteria (604). The predetermined processing criteria (604) of FIG. 6 represents a data structure that specifies data that is relevant to processing provided by the pluggable processing consumer component (602). That is, the pluggable processing provider component (600) uses the predetermined processing criteria (604) to determine whether data produced by the provider component (600) is data that is consumed by the consumer component (602). The predetermined processing criteria (604) of FIG. 6 may specify data that is relevant to processing provided by the pluggable processing consumer component (602) by associating a data type identifier with an identifier for the pluggable processing consumer component (602). The pluggable processing provider component (600) may identify (606) data satisfying predetermined processing criteria (604) according to the method of FIG. 6 by comparing the data type for the data and determining whether that particular data type is associated with the identifier for the pluggable processing consumer component (602) in the predetermined processing criteria (604). If that particular data type is associated with the identifier for the pluggable processing consumer component (602) in the predetermined processing criteria (604), then the data satisfies predetermined processing criteria (604). The data satisfies predetermined processing criteria (604), however, if that particular data type is not associated with the identifier for the pluggable processing consumer component (602) in the predetermined processing criteria (604). Readers will note that the predetermined processing criteria (604) and the manner of identifying (606), by the pluggable processing provider component (600), data satisfying predetermined processing criteria (604) described above is for explanation only and not for limitation.

The method of FIG. 6 also includes passing (610), by the pluggable processing provider component (600), the data (608) to the next pluggable processing component in the application for processing. The next pluggable processing component may be the consumer component (602) or an interim component in the data flow between the provider component (600) and the consumer component (602), which eventually receives the data (608). The pluggable processing provider component (600) may pass (610) the data (608) to the next pluggable processing component in the application for processing according to the method of FIG. 6 by providing the data (608) to a messaging module, which in turn encapsulates the data (608) into packets and transmits the packets to the next pluggable processing component.

In the method of FIG. 6, passing (610), by the pluggable processing provider component (600), the data (608) to the next pluggable processing component in the application for processing includes maintaining (612) access to the data (608). The pluggable processing provider component (600) typically maintains access to the data in the event that the pluggable processing consumer component (600) does not eventually receive the data (608). Maintaining (612) access to the data (608) according to the method of FIG. 6 may be carried out by storing the data (608) in computer memory of the pluggable processing provider component (600) or storing information used by the pluggable processing provider component (600) to recreate the data (608).

The method of FIG. 6 includes receiving (616), by the pluggable processing consumer component (602), the data (608) during execution of the application. The pluggable processing consumer component (602) may receive (616) the data (608) during execution of the application according to the method of FIG. 6 by receiving the data (608) as a parameter of a callback function provided to messaging module, which in turn receives multiple network packets and unencapsulates the data (608) from the network packets.

The method of FIG. 6 also includes sending (620), by the pluggable processing consumer component (602), a receipt (624) indicating that the pluggable processing consumer component (602) received the data (608). The pluggable processing consumer component (602) sends (620) a receipt (624) according to the method of FIG. 6 by identifying when the pluggable processing consumer component (602) receives all of the data (608) and transmitting a receipt (624) to the pluggable processing provider indicating that the pluggable processing consumer component (602) receives all of the data (608). The pluggable processing consumer component (602) may identify when the pluggable processing consumer component (602) receives all of the data (608) by detecting when a messaging module stores an identifier for the data (608) in a network input buffer for the consumer component (602). The messaging module may receive the data (608) by unencapsulating the data (608) from network packets received from the pluggable processing provider component (600). The pluggable processing consumer component (602) may transmitting the receipt (624) by passing the receipt (624) to a messaging module, which in turn encapsulates the receipt (624) into network packets and transfers the packets to the provider component (600).

The method of FIG. 6 includes receiving (622), by the pluggable processing provider component (600) from the pluggable processing consumer component (602), the receipt (624) indicating that the pluggable processing consumer component (602) received the data (608). The pluggable processing provider component (600) may receive (622) the receipt (624) from the pluggable processing consumer component (602) according to the method of FIG. 6 by detecting when a messaging module stores an identifier for the receipt (624) in a network input buffer of the provider component (600). The messaging module may receive the receipt (624) by unencapsulating the receipt (624) from network packets received from the pluggable processing consumer component (602).

The method of FIG. 6 also includes administering (626), by the pluggable processing provider component (602), the data (608) in response to receiving the receipt (624). The pluggable processing provider component (600) may administer (626) the data (608) in response to receiving the receipt (624) according to the method of FIG. 6 by discarding the data (608) or the information used to create the data (608). The provider component (600) may discard the data (608) or the information used to create the data (608) because the receipt (624) indicates that the provider component (600) does not need to resend the data to the consumer component (602). Unless there are other uses for the data (608) or the information used to create the data (608), the provider component (600) has no need to maintain the data (608) or the information used to create the data (608).

The explanation above with reference to FIG. 6 describes a pluggable processing consumer component that communicates directly with a pluggable processing provider component by sending the provider component a receipt for data received by the consumer component. In some other embodiments, the pluggable processing consumer component may relay the receipt to the provider component via a third-party component, namely a system administrative component. For further explanation, therefore, FIG. 7 sets forth a flow chart illustrating a further exemplary method for tracking data processing in an application carried out on a distributed computing system according to embodiments of the present invention. The distributed computing system described with reference to FIG. 7 includes a plurality of computing nodes connected for data communications through a data communications network. The application carried out by a plurality of pluggable processing components (210) installed on the plurality of computing nodes. The pluggable processing components (210) include a pluggable processing provider component (600) and a pluggable processing consumer component (602).

Figure 7:
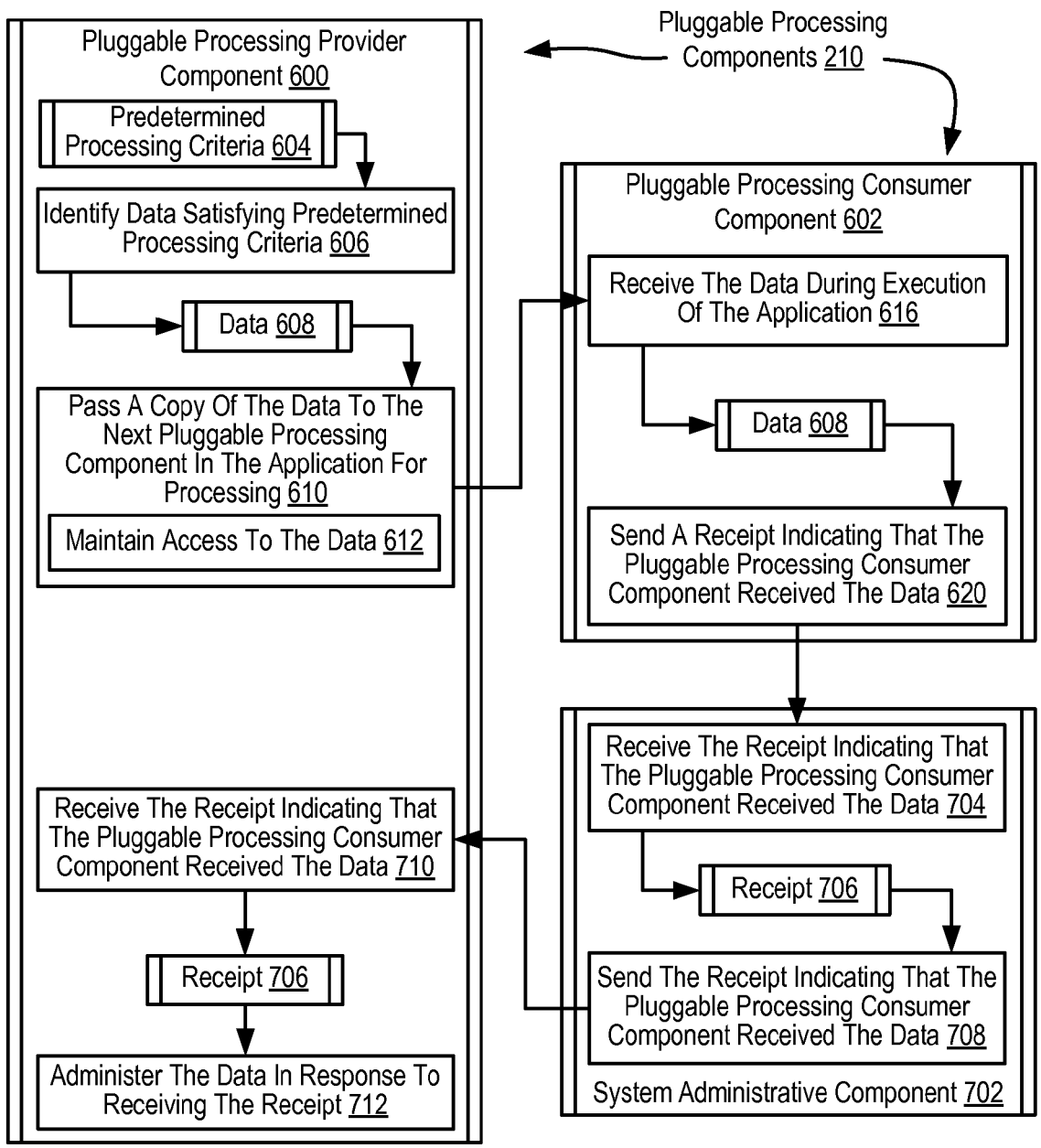
FIG. 7 sets forth a flow chart illustrating a further exemplary method for tracking data processing in an application carried out on a distributed computing system according to embodiments of the present invention.

The method of FIG. 7 is similar to the method of FIG. 6. That is, the method of FIG. 7 includes: identifying (606), by the pluggable processing provider component (600), data satisfying predetermined processing criteria (604), the predetermined processing criteria (604) specifying that the data is relevant to processing provided by the pluggable processing consumer component (602); passing (610), by the pluggable processing provider component (600), the data (608) to the next pluggable processing component in the application for processing, including maintaining (612) access to the data (608); receiving (616), by the pluggable processing consumer component (602), the data (608) during execution of the application; and sending (620), by the pluggable processing consumer component (602), a receipt (706) indicating that the pluggable processing consumer component (602) received the data (608).

The method of FIG. 7 also includes receiving (704), by a system administrative component (702) from the pluggable processing consumer component (602), the receipt (706) indicating that the pluggable processing consumer component (602) received the data (608). The system administrative component (702) may receive (704) the receipt (706) from the pluggable processing consumer component (602) according to the method of FIG. 7 by detecting when a messaging module stores an identifier for the receipt (706) in a network input buffer of the administrative component (702). The messaging module may receive the receipt (706) by unencapsulating the receipt (706) from network packets received from the pluggable processing consumer component (602).

The method of FIG. 7 includes sending (708), by the system administrative component (702) to the pluggable processing provider component (600), the receipt (706) indicating that the pluggable processing consumer component (602) received the data (608). The system administrative component (702) may send (708) the receipt (706) to the pluggable processing provider component (600) indicating that the pluggable processing consumer component (602) received the data (608) according to the method of FIG. 7 by passing the receipt (706) to a messaging module, which in turn encapsulates the receipt (706) into network packets and transmits the packets to the provider component (600).

The method of FIG. 7 also includes receiving (710), by the pluggable processing provider component (600) from the system administrative component (702), the receipt (706) indicating that the pluggable processing consumer component (602) received the data (608). The pluggable processing provider component (600) may receive (710) the receipt (706) from the system administrative component (702) according to the method of FIG. 7 by detecting when a messaging module stores an identifier for the receipt (706) in a network input buffer of the provider component (600). The messaging module may receive the receipt (706) by unencapsulating the receipt (706) from network packets received from the system administrative component (702).

The method of FIG. 7 includes administering (712), by the pluggable processing provider component (600), the data (608) in response to receiving the receipt (706). The pluggable processing provider component (600) may administer (712) the data (608) in response to receiving the receipt (706) according to the method of FIG. 7 by discarding the data (608) or the information used to create the data (608). The provider component (600) may discard the data (608) or the information used to create the data (608) because the receipt (706) indicates that the provider component (600) does not need to resend the data to the consumer component (602). Unless there are other uses for the data (608) or the information used to create the data (608), the provider component (600) has no need to maintain the data (608) or the information used to create the data (608).

The explanation above with reference to FIGS. 6 and 7 describes embodiments in which the pluggable processing consumer component receives the data and sends a receipt to the pluggable processing provider component, which in turn discards the data. In some other embodiments, the pluggable processing provider component may not receive the receipt from the pluggable processing consumer component because the consumer component never receives the data. For further explanation, therefore, FIG. 8 sets forth a flow chart illustrating a further exemplary method for tracking data processing in an application carried out on a distributed computing system according to embodiments of the present invention. The distributed computing system described with reference to FIG. 8 includes a plurality of computing nodes connected for data communications through a data communications network. The application carried out by a plurality of pluggable processing components (210) installed on the plurality of computing nodes. The pluggable processing components (210) include a pluggable processing provider component (600) and a pluggable processing consumer component (602).

Figure 8:
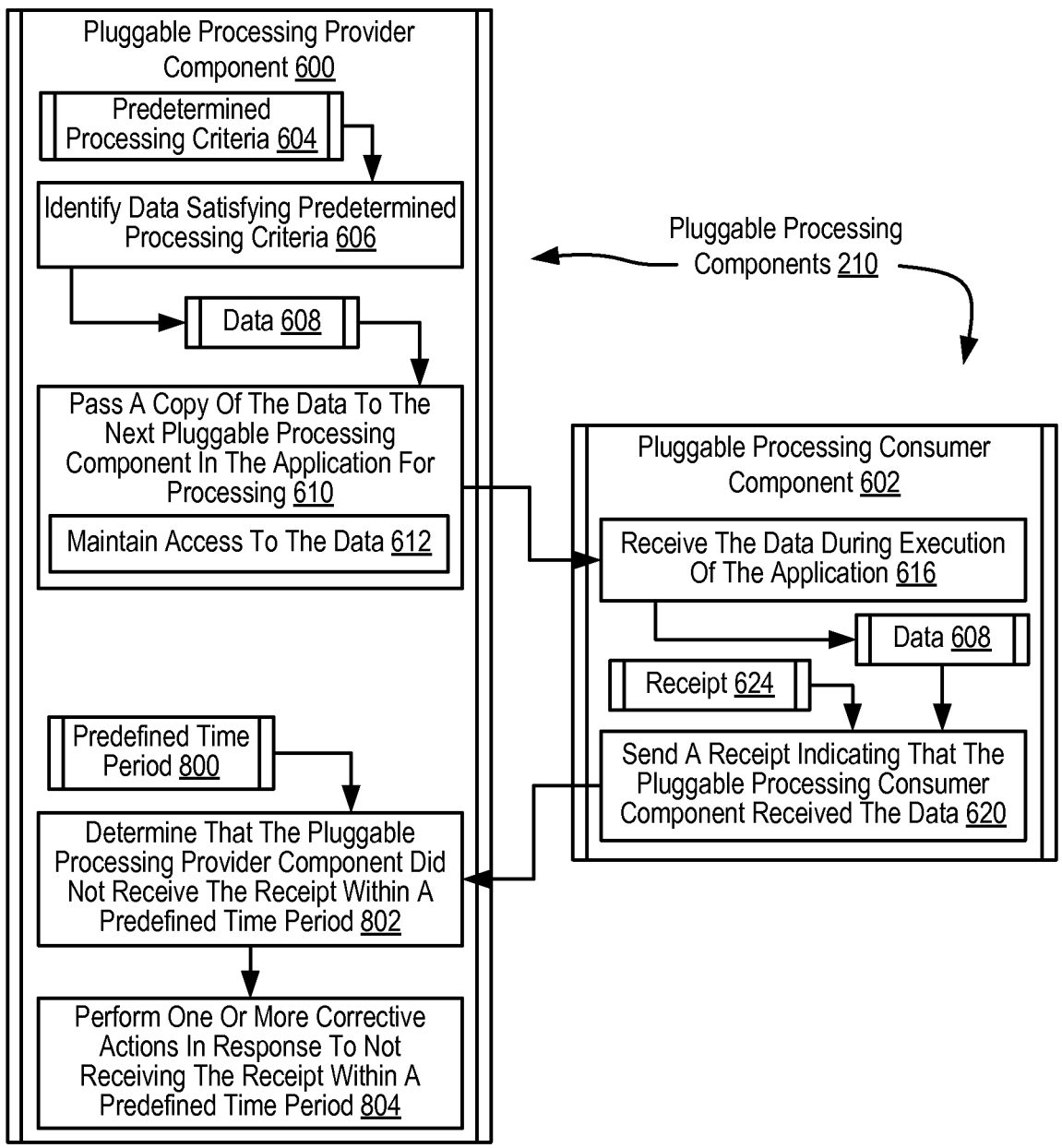
FIG. 8 sets forth a flow chart illustrating a further exemplary method for tracking data processing in an application carried out on a distributed computing system according to embodiments of the present invention.

The method of FIG. 8 is similar to the method of FIG. 6. That is, the method of FIG. 8 includes: identifying (606), by the pluggable processing provider component (600), data satisfying predetermined processing criteria (604), the predetermined processing criteria (604) specifying that the data is relevant to processing provided by the pluggable processing consumer component (602); passing (610), by the pluggable processing provider component (600), the data (608) to the next pluggable processing component in the application for processing, including maintaining (612) access to the data (608); receiving (616), by the pluggable processing consumer component (602), the data (608) during execution of the application; and sending (620), by the pluggable processing consumer component (602), a receipt (624) indicating that the pluggable processing consumer component (602) received the data (608).

The method of FIG. 8 includes determining (802), by the pluggable processing provider component (600), that the pluggable processing provider component (600) did not receive the receipt (624) within a predefined time period (800). The pluggable processing provider component (600) may determine (802) that the pluggable processing provider component (600) did not receive the receipt (624) within a predefined time period (800) according to the method of FIG. 8 by comparing the predefined time period (800) with the elapsed time period between when the data (608) was passed to the consumer component (602) and the current time. When the elapsed time period between when the data (608) was passed to the consumer component (602) and the current time exceeds the predefined time period (800), then the pluggable processing provider component (600) did not receive the receipt (624) within the predefined time period (800). The pluggable processing provider component (600) may not have received the receipt (624) within the predefined time period (800) because the consumer component (602) never received the data (608), the consumer component (602) failed to generate the receipt (624), the receipt (624) was lost during transmission, and so on.

The method of FIG. 8 also includes performing (804), by the pluggable processing provider component (600), one or more corrective actions in response to not receiving the receipt within a predefined time period (800). The pluggable processing provider component (600) may perform (804) a corrective action according to the method of FIG. 8 by querying the consumer component (602) to discover whether the consumer component (602) did not receive the data (608), why the receipt (624) was not sent, and so on. The query information may be recorded in an error log for later review by a system administrator. In addition, the pluggable processing provider component (600) may perform (804) a corrective action according to the method of FIG. 8 by resending the data (608) to the pluggable processing consumer component (602).

Exemplary embodiments of the present invention are described largely in the context of a fully functional computer system for tracking data processing in an application carried out on a distributed computing system. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of tracking data processing in an application carried out on a distributed computing system, the distributed computing system comprising a plurality of computing nodes connected for data communications through a data communications network, the application carried out by a plurality of pluggable processing components installed on the plurality of computing nodes, the pluggable processing components including a pluggable processing provider component and a pluggable processing consumer component, the method comprising:
   identifying, by the pluggable processing provider component, data satisfying predetermined processing criteria, the predetermined processing criteria specifying that the data is relevant to processing provided by the pluggable processing consumer component;
   passing, by the pluggable processing provider component, the data to the next pluggable processing component in the application for processing, including maintaining access to the data;
   receiving, by the pluggable processing consumer component, the data during execution of the application; and
   sending, by the pluggable processing consumer component, a receipt indicating that the pluggable processing consumer component received the data.

2. The method of claim 1 further comprising:
   receiving, by the pluggable processing provider component from the pluggable processing consumer component, the receipt indicating that the pluggable processing consumer component received the data; and
   administering, by the pluggable processing provider component, the data in response to receiving the receipt.

3. The method of claim 1 further comprising:
   receiving, by a system administrative component from the pluggable processing consumer component, the receipt indicating that the pluggable processing consumer component received the data;
   sending, by the system administrative component to the pluggable processing provider component, the receipt indicating that the pluggable processing consumer component received the data;
   receiving, by the pluggable processing provider component from the system administrative component, the receipt indicating that the pluggable processing consumer component received the data; and
   administering, by the pluggable processing provider component, the data in response to receiving the receipt.

4. The method of claim 1 further comprising:
   determining, by the pluggable processing provider component, that the pluggable processing provider component did not receive the receipt within a predefined time period; and
   performing, by the pluggable processing provider component, one or more corrective actions in response to not receiving the receipt within a predefined time period.

5. The method of claim 1 wherein maintaining access to the data further comprises storing the data in computer memory of the pluggable processing provider component.

6. The method of claim 1 wherein maintaining access to the data further comprises storing information used by the pluggable processing provider component to recreate the data.

7. A distributed computing system capable of tracking data processing in an application carried out on the distributed computing system, the distributed computing system comprising a plurality of computing nodes connected for data communications through a data communications network, the application carried out by a plurality of pluggable processing components installed on the plurality of computing nodes, the pluggable processing components including a pluggable processing provider component and a pluggable processing consumer component, the distributed computing system comprising one or more computer processors and computer memory operatively coupled to the computer processors, the computer memory for the distributed computing system having disposed within it computer program instructions capable of:
   identifying, by the pluggable processing provider component, data satisfying predetermined processing criteria, the predetermined processing criteria specifying that the data is relevant to processing provided by the pluggable processing consumer component;
   passing, by the pluggable processing provider component, the data to the next pluggable processing component in the application for processing, including maintaining access to the data;
   receiving, by the pluggable processing consumer component, the data during execution of the application; and
   sending, by the pluggable processing consumer component, a receipt indicating that the pluggable processing consumer component received the data.

8. The distributed computing system of claim 7 wherein the computer memory for the distributed computing system has disposed within it computer program instructions capable of:
   receiving, by the pluggable processing provider component from the pluggable processing consumer component, the receipt indicating that the pluggable processing consumer component received the data; and
   administering, by the pluggable processing provider component, the data in response to receiving the receipt.

9. The distributed computing system of claim 7 wherein the computer memory for the distributed computing system has disposed within it computer program instructions capable of:
   receiving, by a system administrative component from the pluggable processing consumer component, the receipt indicating that the pluggable processing consumer component received the data;
   sending, by the system administrative component to the pluggable processing provider component, the receipt indicating that the pluggable processing consumer component received the data;
   receiving, by the pluggable processing provider component from the system administrative component, the receipt indicating that the pluggable processing consumer component received the data; and administering, by the pluggable processing provider component, the data in response to receiving the receipt.

10. The distributed computing system of claim 7 wherein the computer memory for the distributed computing system has disposed within it computer program instructions capable of:

determining, by the pluggable processing provider component, that the pluggable processing provider component did not receive the receipt within a predefined time period; and performing, by the pluggable processing provider component, one or more corrective actions in response to not receiving the receipt within a predefined time period.

11. The distributed computing system of claim 7 wherein maintaining access to the data further comprises storing the data in computer memory of the pluggable processing provider component.

12. The distributed computing system of claim 7 wherein maintaining access to the data further comprises storing information used by the pluggable processing provider component to recreate the data.

13. A computer program product for tracking data processing in an application carried out on a distributed computing system, the distributed computing system comprising a plurality of computing nodes connected for data communications through a data communications network, the application carried out by a plurality of pluggable processing components installed on the plurality of computing nodes, the pluggable processing components including a pluggable processing provider component and a pluggable processing consumer component, the computer program product disposed upon a non-transitory computer readable medium, the computer program product comprising computer program instructions capable of:

identifying, by the pluggable processing provider component, data satisfying predetermined processing criteria, the predetermined processing criteria specifying that the data is relevant to processing provided by the pluggable processing consumer component;

passing, by the pluggable processing provider component, the data to the next pluggable processing component in the application for processing, including maintaining access to the data;

receiving, by the pluggable processing consumer component, the data during execution of the application; and sending, by the pluggable processing consumer component, a receipt indicating that the pluggable processing consumer component received the data.

14. The computer program product of claim 13 further comprising computer program instructions capable of:

receiving, by the pluggable processing provider component from the pluggable processing consumer component, the receipt indicating that the pluggable processing consumer component received the data; and administering, by the pluggable processing provider component, the data in response to receiving the receipt.

15. The computer program product of claim 13 further comprising computer program instructions capable of:

receiving, by a system administrative component from the pluggable processing consumer component, the receipt indicating that the pluggable processing consumer component received the data;

sending, by the system administrative component to the pluggable processing provider component, the receipt indicating that the pluggable processing consumer component received the data;

receiving, by the pluggable processing provider component from the system administrative component, the receipt indicating that the pluggable processing consumer component received the data; and administering, by the pluggable processing provider component, the data in response to receiving the receipt.

16. The computer program product of claim 13 further comprising computer program instructions capable of:

determining, by the pluggable processing provider component, that the pluggable processing provider component did not receive the receipt within a predefined time period; and performing, by the pluggable processing provider component, one or more corrective actions in response to not receiving the receipt within a predefined time period.

17. The computer program product of claim 13 wherein maintaining access to the data further comprises storing the data in computer memory of the pluggable processing provider component.

18. The computer program product of claim 13 wherein maintaining access to the data further comprises storing information used by the pluggable processing provider component to recreate the data.

* * * * *